United States Patent
Kalimuthu Rameshwaran et al.

(10) Patent No.: US 12,368,478 B2
(45) Date of Patent: Jul. 22, 2025

(54) SYSTEMS AND METHODS FOR META-SURFACE-BASED BEAMFORMING

(71) Applicant: Tata Consultancy Services Limited, Mumbai (IN)

(72) Inventors: Arunkumar Kalimuthu Rameshwaran, Bengaluru (IN); Tapas Chakravarty, Kolkata (IN); Achanna Anil Kumar, Bengaluru (IN); Poornima Surojia, Hyderabad (IN); Roshan Khobragade, Hyderabad (IN); Lakshmi Narayana Meda, Bengaluru (IN)

(73) Assignee: Tata Consultancy Services Limited, Mumbai (IN)

( * ) Notice: Subject to any disclaimer, the term of this patent is extended or adjusted under 35 U.S.C. 154(b) by 81 days.

(21) Appl. No.: 18/479,433

(22) Filed: Oct. 2, 2023

(65) Prior Publication Data
US 2024/0267098 A1 Aug. 8, 2024

(30) Foreign Application Priority Data
Feb. 8, 2023 (IN) .............................. 202321008170

(51) Int. Cl.
*H04B 7/0456* (2017.01)
*H04L 25/02* (2006.01)
*H04L 27/20* (2006.01)

(52) U.S. Cl.
CPC ....... *H04B 7/0456* (2013.01); *H04L 25/0202* (2013.01); *H04L 27/20* (2013.01)

(58) Field of Classification Search
CPC ..... H04L 27/18; H04L 27/02; H04L 63/0823; H04L 27/2662; H04L 5/0023;
(Continued)

(56) References Cited

U.S. PATENT DOCUMENTS

2004/0105516 A1* 6/2004 Smith .................... H03L 7/191
375/354
2021/0036753 A1* 2/2021 Lee ........................ H01Q 21/28
(Continued)

FOREIGN PATENT DOCUMENTS

| WO | WO 2006/013487 A1 | 9/2006 |
| WO | WO 2022/007417 A1 | 1/2022 |
| WO | WO 2022/063435 A1 | 3/2022 |

OTHER PUBLICATIONS

George C. Alexandropoulos et al. "A Hardware Architecture for Reconfigurable Intelligent Surfaces with Minimal Active Elements for Explicit Channel Estimation," ICASSP 2020-2020 IEEE International Conference on Acoustics, Speech and Signal Processing (ICASSP), May 25, 2022, arxiv https://arxiv.org/pdf/2002.10371.pdf.

(Continued)

*Primary Examiner* — Eva Y Puente
(74) *Attorney, Agent, or Firm* — Finnegan, Henderson, Farabow, Garrett & Dunner, LLP

(57) ABSTRACT

Beamforming is a vital component in space division multiple access (SDMA) and currently employed sectorial beamforming that radiates throughout sector(s) is not sufficient for next generation communication systems. Hence, massive Multiple-Input Multiple-Output (MIMO) having large number of antenna elements is employed in 5G and beyond communication systems that has capability to provide practically realizable SDMA. However, such setups are not economical as large number of antenna elements are employed. Present disclosure provides systems and methods that implement electro-mechanical beam tilting based approach, that uses a single antenna element coupled with a meta-surface mounted on top which provides a directional beam leading to an improvement in signal to noise ratio (SNR). The meta-surface-based beamforming architecture (Continued)

of the system provides an improved bit error rate (BER) and spectral efficiency (SE) with huge reduction in number of antenna elements without using phase-shifter.

18 Claims, 7 Drawing Sheets

(58) Field of Classification Search
CPC . H04L 7/0075; H04L 41/145; H04L 27/0002; H04W 24/02; H04W 16/28; H04W 52/14; H04W 52/143; H04W 52/146; H04W 52/42; H04W 52/46; H04W 52/52; H04B 7/0617; H04B 7/04013; H04B 10/11; H04B 17/318; H04B 10/503; H04B 17/103; H04B 17/382; H04B 10/40
See application file for complete search history.

(56) References Cited

U.S. PATENT DOCUMENTS

| | | | | |
|---|---|---|---|---|
| 2021/0167512 | A1* | 6/2021 | Lee | H04B 7/0408 |
| 2023/0136372 | A1* | 5/2023 | Ratnam | H04B 7/0667 |
| | | | | 375/267 |
| 2023/0336237 | A1* | 10/2023 | Hormis | H04B 7/08 |
| 2024/0162960 | A1* | 5/2024 | Åström | H04B 7/0617 |

OTHER PUBLICATIONS

Jie Huang et al., "Reconfigurable Intelligent Surfaces: Channel Characterization and Modeling," Proceedings of the IEEE, Jun. 6, 2022, vol. 110, Issue: 9, arxiv, https://arxiv.org/abs/2206.02308.
Chia-Chi Chung et al., "Anisotropic Metasurface With Asymmetric Propagation of Electromagnetic Waves and Enhancements of Antenna Gain," IEEE Access, Jun. 22, 2021, pp. 90295-90305, vol. 9, IEEE, https://ieeexplore.ieee.org/stamp/stamp.jsp?arnumber=9462092.
Daniyal Ali Sehrai et al., "Metasurface-Based Wideband MIMO Antenna for 5G Millimeter-Wave Systems," IEEE Access, Sep. 2021, IEEE, https://www.researchgate.net/publication/354431838_Metasurface-Based_Wideband_MIMO_Antenna_for_5G_Millimeter-Wave_Systems.

* cited by examiner

SYSTEMS AND METHODS FOR META-SURFACE-BASED BEAMFORMING

PRIORITY CLAIM

This U.S. patent application claims priority under 35 U.S.C. § 119 to: Indian Patent Application No. 202321008170, filed on Feb. 8, 2023. The entire contents of the aforementioned application are incorporated herein by reference.

TECHNICAL FIELD

The disclosure herein generally relates to beamforming techniques for communication systems, and, more particularly, to systems and methods for meta-surface-based beamforming.

BACKGROUND

Next generation communication system demands high data rate with ultra-reliable, low latency communication and also high-density connectivity. Time and frequency division multiple access techniques that are currently used are incapable to support these requirements, thus leading to the exploration of space division multiple access (SDMA) where all the users communicate at the same time over the same frequency band. Beamforming, that directs the beam in the desired direction, is a vital component in SDMA and the currently employed sectorial beamforming that radiates throughout the sector is not sufficient for next generation communication systems. Hence, massive Multiple-Input Multiple-Output (MIMO) which comprises of large number of antenna elements is employed in 5G and beyond communication systems that has the capability to provide practically realizable SDMA. Implementation of digital beamforming, which requires a dedicated Radio Frequency (RF) chain for each antenna element is not economical in massive MIMO as large number of antenna elements are employed. This limitation has resulted in using hybrid beamforming that aims to reduce the number of RF chains. While in such architecture, the number of RF chains are reduced, the number of phase shifters is same as the number of antenna elements.

SUMMARY

Embodiments of the present disclosure present technological improvements as solutions to one or more of the above-mentioned technical problems recognized by the inventors in conventional systems.

For example, in one aspect, there is provided a processor implemented method for meta-surface-based beamforming. The method comprises receiving, at a base station via one or more hardware processors, an input comprising a plurality of parameters specific to a first set of antennas and a second set of antennas, an angle of arrival (AoA) specific to a user device, and an angle of departure (AoD) specific to the user device; estimating, via the one or more hardware processors, a communication channel of a specific dimension for a meta-surface-based beamforming, by using the AoA, the AoD, and a gain pertaining to the first set of antennas; modulating, by using a modulation technique via the one or more hardware processors, a plurality of transmitting signals pertaining to the first set of antennas to be transmitted over the estimated communication channel to obtain a plurality of modulated transmitting signals; generating, via the one or more hardware processors, a gain and a plurality of phase adjusted modulated transmitting signals based on one or more precoder weights comprising a first pre-defined gain and a phase associated with the estimated communication channel; and transmitting, via the one or more hardware processors, the generated gain and the plurality of phase adjusted modulated transmitting signals over the estimated communication channel to the user device.

In an embodiment, the step of estimating the communication channel comprises calculating a delay for each of the first set of antennas, based on the AoD of the plurality of transmitting signals corresponding to the first set of antennas; calculating a plurality of steering vectors for the first set of antennas from the delay; and estimating the communication channel based on the plurality of steering vectors and a directional gain of each of the first set of antennas.

In an embodiment, the plurality of steering vectors is calculated based on the delay that maximizes strength of the plurality of transmitting signals.

In an embodiment, the step of transmitting the generated gain and the plurality of phase adjusted modulated transmitting signals over the estimated communication channel to the user device comprises a varying Gaussian noise component in the estimated communication channel.

In an embodiment, at the user device, one or more hardware processors comprised therein are configured to: receive, via the second set of antennas over the estimated communication channel, the generated gain and the plurality of phase adjusted modulated transmitting signals; decode the generated gain and the plurality of phase adjusted modulated transmitting signals to obtain a set of modulated received signals; demodulate, by using the demodulation technique, the plurality of modulated received signals to obtain a plurality of received signals; perform a comparison of the plurality of transmitting signals and the plurality of received signals; and evaluate a performance of the meta-surface-based beamforming based on the comparison.

In an embodiment, the step of decoding the generated gain and the plurality of phase adjusted modulated transmitting signals to obtain the set of modulated received signals is based on a transpose of one or more combiner weights comprising a second pre-defined gain and a phase associated with to the estimated communication channel.

In an embodiment, the one or more precoder weights and the one or more combiner weights are calculated from the estimated communication channel using a singular value decomposition technique.

In an embodiment, the step of performing the comparison is based on a Signal to Noise Ratio (SNR) and a Bit Error Rate (BER) of the plurality of transmitting signals and the plurality of received signals.

In an embodiment, the angle of arrival (AoA) and the angle of departure (AoD) are obtained based on a scanning angle ranging between a first pre-defined angle and a second pre-defined angle.

In another aspect, there is provided a processor implemented system for meta-surface-based beamforming. The system comprises: a memory storing instructions; one or more communication interfaces; and one or more hardware processors coupled to the memory via the one or more communication interfaces, wherein the one or more hardware processors are configured by the instructions to: receive, at a base station via one or more hardware processors, an input comprising a plurality of parameters specific to a first set of antennas and a second set of antennas, an angle of arrival (AoA) specific to a user device, and an angle of departure (AoD) specific to the user device; estimate, via the one or more hardware processors, a communication channel of a specific dimension for a meta-surface-based beamforming, by using the AoA, the AoD, and a gain pertaining to the first set of antennas; modulate, by using a modulation technique via the one or more hardware processors, a plurality of transmitting signals pertaining to the first set of antennas to be transmitted over the estimated communication channel to obtain a plurality of modulated transmitting signals; generate, via the one or more hardware processors, a gain and a plurality of phase adjusted modulated transmitting signals based on one or more precoder weights comprising a first pre-defined gain and a phase associated with the estimated communication channel; and transmit, via the one or more hardware processors, the generated gain and the plurality of phase adjusted modulated transmitting signals over the estimated communication channel to the user device.

In an embodiment, the communication channel is estimated by: calculating a delay for each of the first set of antennas, based on the AoD of the plurality of transmitting signals corresponding to the first set of antennas; calculating a plurality of steering vectors for the first set of antennas from the delay; and estimating the communication channel based on the plurality of steering vectors and a directional gain of each of the first set of antennas.

In an embodiment, the plurality of steering vectors is calculated based on the delay that maximizes strength of the plurality of transmitting signals.

In an embodiment, the generated gain and the plurality of phase adjusted modulated transmitting signals transmitted over the estimated communication channel to the user device comprises a varying Gaussian noise component in the estimated communication channel.

In an embodiment, at the user device, one or more hardware processors comprised therein are configured to: receive, via the second set of antennas over the estimated communication channel, the generated gain and the plurality of phase adjusted modulated transmitting signals; decode the generated gain and the plurality of phase adjusted modulated transmitting signals to obtain a set of modulated received signals; demodulate, by using the demodulation technique, the plurality of modulated received signals to obtain a plurality of received signals; perform a comparison of the plurality of transmitting signals and the plurality of received signals; and evaluate a performance of the meta-surface-based beamforming based on the comparison.

In an embodiment, the generated gain and the plurality of phase adjusted modulated transmitting signals are decoded to obtain the set of modulated received signals is based on a transpose of one or more combiner weights comprising a second pre-defined gain and a phase associated with to the estimated communication channel.

In an embodiment, the one or more precoder weights and the one or more combiner weights are calculated from the estimated communication channel using a singular value decomposition technique.

In an embodiment, the comparison is based on a Signal to Noise Ratio (SNR) and a Bit Error Rate (BER) of the plurality of transmitting signals and the plurality of received signals.

In an embodiment, the angle of arrival (AoA) and the angle of departure (AoD) are obtained based on a scanning angle ranging between a first pre-defined angle and a second pre-defined angle.

In yet another aspect, there are provided one or more non-transitory machine-readable information storage mediums comprising one or more instructions which when executed by one or more hardware processors cause meta-surface-based beamforming by: receiving, at a base station via the one or more hardware processors, an input comprising a plurality of parameters specific to a first set of antennas and a second set of antennas, an angle of arrival (AoA) specific to a user device, and an angle of departure (AoD) specific to the user device; estimating, via the one or more hardware processors, a communication channel of a specific dimension for a meta-surface-based beamforming, by using the AoA, the AoD, and a gain pertaining to the first set of antennas; modulating, by using a modulation technique via the one or more hardware processors, a plurality of transmitting signals pertaining to the first set of antennas to be transmitted over the estimated communication channel to obtain a plurality of modulated transmitting signals; generating, via the one or more hardware processors, a gain and a plurality of phase adjusted modulated transmitting signals based on one or more precoder weights comprising a first pre-defined gain and a phase associated with the estimated communication channel; and transmitting, via the one or more hardware processors, the generated gain and the plurality of phase adjusted modulated transmitting signals over the estimated communication channel to the user device.

In an embodiment, the step of estimating the communication channel comprises: calculating a delay for each of the first set of antennas, based on the AoD of the plurality of transmitting signals corresponding to the first set of antennas; calculating a plurality of steering vectors for the first set of antennas from the delay; and estimating the communication channel based on the plurality of steering vectors and a directional gain of each of the first set of antennas.

In an embodiment, the plurality of steering vectors is calculated based on the delay that maximizes strength of the plurality of transmitting signals.

In an embodiment, the step of transmitting the generated gain and the plurality of phase adjusted modulated transmitting signals over the estimated communication channel to the user device comprises a varying Gaussian noise component in the estimated communication channel.

In an embodiment, at the user device, one or more hardware processors comprised therein are configured to: receive, via the second set of antennas over the estimated communication channel, the generated gain and the plurality of phase adjusted modulated transmitting signals; decode the generated gain and the plurality of phase adjusted modulated transmitting signals to obtain a set of modulated received signals; demodulate, by using the demodulation technique, the plurality of modulated received signals to obtain a plurality of received signals; perform a comparison of the plurality of transmitting signals and the plurality of received signals; and evaluate a performance of the meta-surface-based beamforming based on the comparison.

In an embodiment, the step of decoding the generated gain and the plurality of phase adjusted modulated transmitting signals to obtain the set of modulated received signals is based on a transpose of one or more combiner weights comprising a second pre-defined gain and a phase associated with to the estimated communication channel.

In an embodiment, the one or more precoder weights and the one or more combiner weights are calculated from the estimated communication channel using a singular value decomposition technique.

In an embodiment, the step of performing the comparison is based on a Signal to Noise Ratio (SNR) and a Bit Error Rate (BER) of the plurality of transmitting signals and the plurality of received signals.

In an embodiment, the angle of arrival (AoA) and the angle of departure (AoD) are obtained based on a scanning angle ranging between a first pre-defined angle and a second pre-defined angle.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Next generation wireless communications demand high bandwidth to support high data rate. This requirement is non-viable in sub-6-GHz band because this band is occupied. However, 3GPP has identified FR2 band (24250 MHz-52600 MHZ) in milli-meter wave (mmWave) frequency range, with sufficient spectrum which can be used by the next generation wireless communication. Such mmWave communication suffers from high path loss and these do not diffract compared to the lower frequency signals resulting in severe signal blockage. At the same time, due to the smaller wavelength a greater number of antenna elements can be accommodated in a smaller physical aperture size). Using multiple input multiple output (MIMO), the signal radiated from each antenna element after varying its phase is added constructively resulting in beamforming that directs the beam towards the desired direction.

Figure 1A:
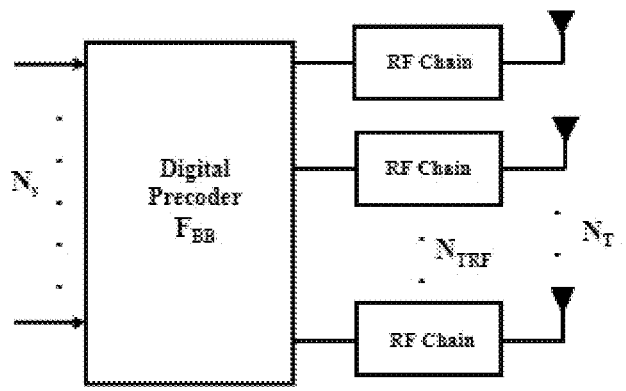
FIG. 1A depicts a digital beamforming architecture as known in the art.
Figure 1B:
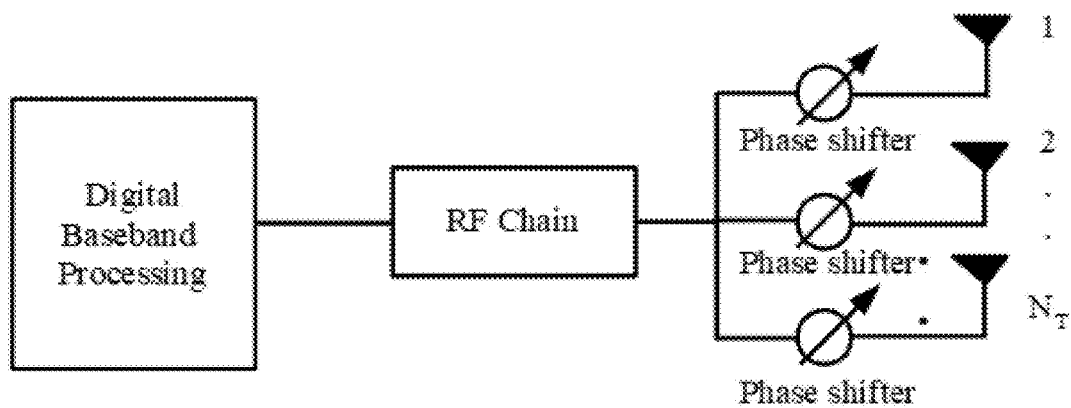
FIG. 1B depicts an analog beamforming architecture as known in the art.
Figure 1C:
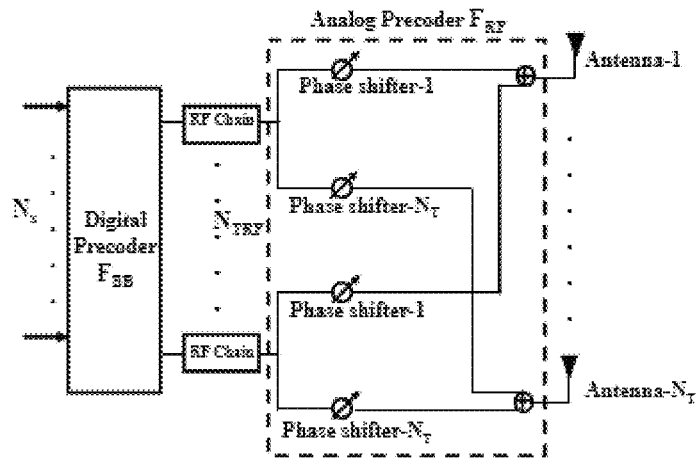
FIG. 1C depicts a fully connected hybrid beamforming (HB) architecture as known in the art.
Figure 1D:
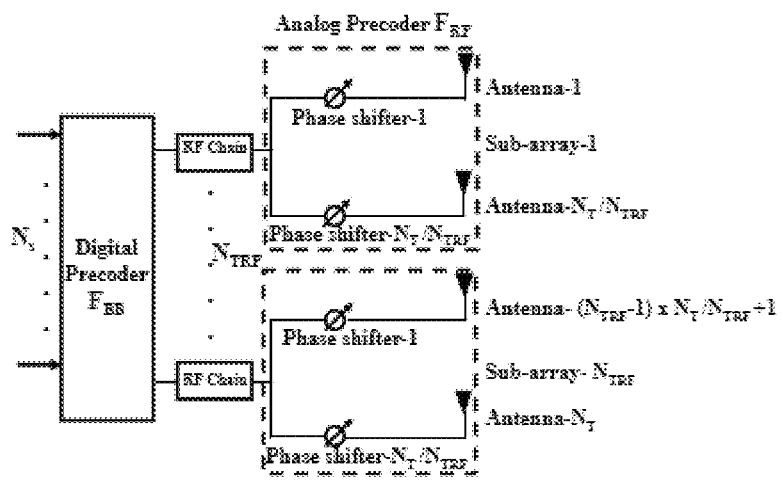
FIG. 1D depicts a sub/partially connected HB architecture as known in the art.

In practice, several beamforming architectures like digital beamforming (DB), analog beamforming (AB) and hybrid beamforming (HB) have been proposed. FIG. 1A and FIG. 1B depict different beamforming architecture as known in the art. In DB as shown in FIG. 1A, each antenna is connected to a dedicated RF chain. This provides enormous flexibility where both gain and phase are adjusted. However, at mmWave band with large bandwidth, usage of many RF chains results in enormous signal processing requirements that are impractical to handle. FIG. 1B shows the AB, that uses only one RF chain that is connected to multiple antenna elements via phase shifters (PS). The hardware complexity of AB is significantly less than DB, but it can service only one user per time slot. The HB architecture, that combines DB and AB, the hardware complexity is in between DB and AB. FIGS. 1C and 1D show two different forms of HB architecture, namely Fully connected and Sub/partially connected HB architecture as known in the art. Unlike the limitations of AB, the HB can simultaneously service multiple users. In a fully connected architecture, each RF chain is connected to all the antennas via PS and the overall usage of PS is the product of total number of RF chains and the antenna elements (i.e, PS=RFchains×antennas). In sub/partially connected architecture, each RF chain is connected to a subarray of antennas having PS same as the number of antennas in a sub-array (PS=antennas/RFchains). The usage of more PS in fully connected HB resulted in high power consumption and system complexity. Given less usage of PS in sub/partially connected HB resulted in simplified architecture and is highly preferred for practical implementation. The use of PS increases the latency, and it also suffers from poor phase gradient.

Present disclosure provides system and method that implement a beamforming architecture using a fixed beam meta-surface (MS). MS, a 2D artificial material comprising multiple unit cells is arranged in an array fashion that varies the electrical and magnetic properties of the electromagnetic wave. It has the capability to make the beam directive, when mounted on a radiating antenna. More specifically, in the present disclosure, system and method implement an array structure comprising of partial overlapping beams and a beamforming technique based on multi-user MIMO. The high directive gain provided by MS module improves the SNR, thereby providing better BER performance compared to the conventional DB comprising of an array of isotropic antenna elements. As shall be shown later, the method implemented herein has achieved superior performance over DB even at using lesser RF chains.

The advantages of the MS based MIMO beamforming architecture as implemented by the system and method of the present disclosure are as follows:

1. Though the RF complexity remains similar to that of HB, it overcomes the usage of PS that are used in HB.
2. Improved SNR due to the usage of MS module that provides the directive beam.
3. Improved performance in terms of BER compared to the BER of DB and HB with reduced computational complexity.

Referring now to the drawings, and more particularly to FIGS. 2 through 7, where similar reference characters denote corresponding features consistently throughout the figures, there are shown preferred embodiments and these embodiments are described in the context of the following exemplary system and/or method.

Figure 2:
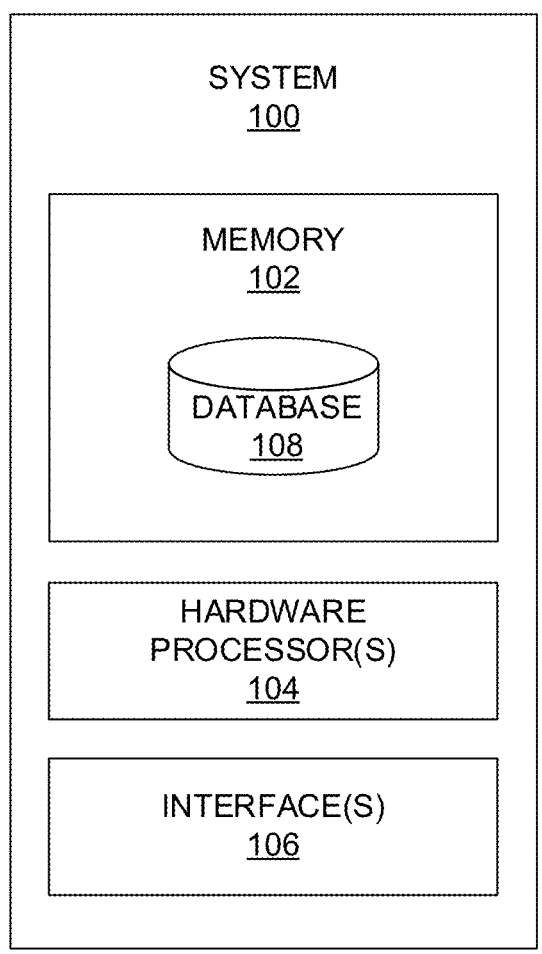
FIG. 2 depicts an exemplary system for meta-surface-based beamforming, in accordance with an embodiment of the present disclosure.

FIG. 2 depicts an exemplary system 100 for meta-surface-based beamforming, in accordance with an embodiment of the present disclosure. The system 100 is also referred as 'a base station 100' and interchangeably used herein. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices (e.g., smartphones, tablet phones, mobile communication devices, and the like), workstations, mainframe computers, servers, a network cloud, and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random-access memory (SRAM) and dynamic-random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the database 108 comprises information a plurality of parameters specific to a first set of antennas and a second set of antennas, an angle of arrival (AoA) specific to a user device, and an angle of departure (AoD) specific to the user device. The database 108 further comprises a communication channel of a specific dimension for a meta-surface-based beamforming being estimated, a plurality of modulated transmitting signals, a gain and a plurality of phase adjusted modulated transmitting signals, a delay for each of the first set of antennas, a plurality of steering vectors, a directional gain of each of the first set of antennas, a Gaussian noise component in the estimated communication channel, and the like. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

Figure 3:
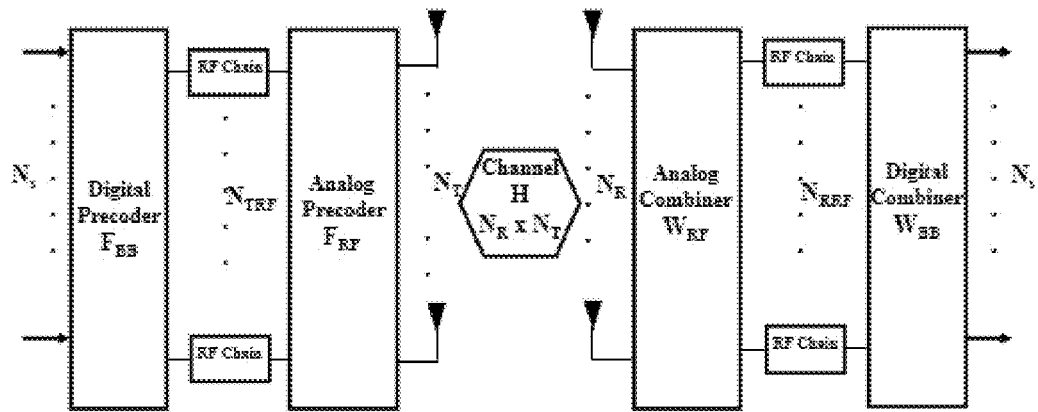
FIG. 3 depicts an exemplary high level block diagram of a hybrid meta-surface-based beamforming (HB) architecture as implemented by the system of FIG. 2, in accordance with an embodiment of the present disclosure.

FIG. 3, with reference to FIG. 2, depicts an exemplary high level block diagram of a hybrid meta-surface-based beamforming (HB) architecture as implemented by the system 100 of FIG. 2, in accordance with an embodiment of the present disclosure.

Figure 4:
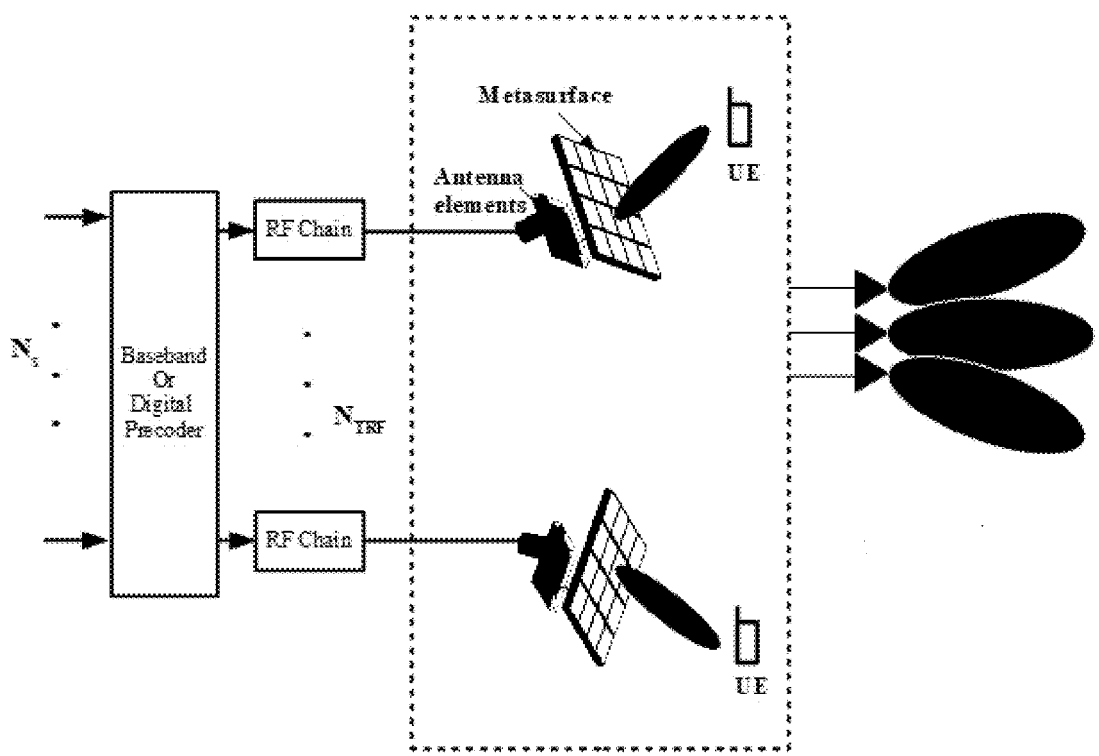
FIG. 4 depicts an exemplary high level block diagram of the system of FIG. 2 for meta-surface-based beamforming, in accordance with an embodiment of the present disclosure.

FIG. 4, with reference to FIGS. 2 through 3, depicts an exemplary high level block diagram of the system 100 for meta-surface-based beamforming, in accordance with an embodiment of the present disclosure.

Figure 5:
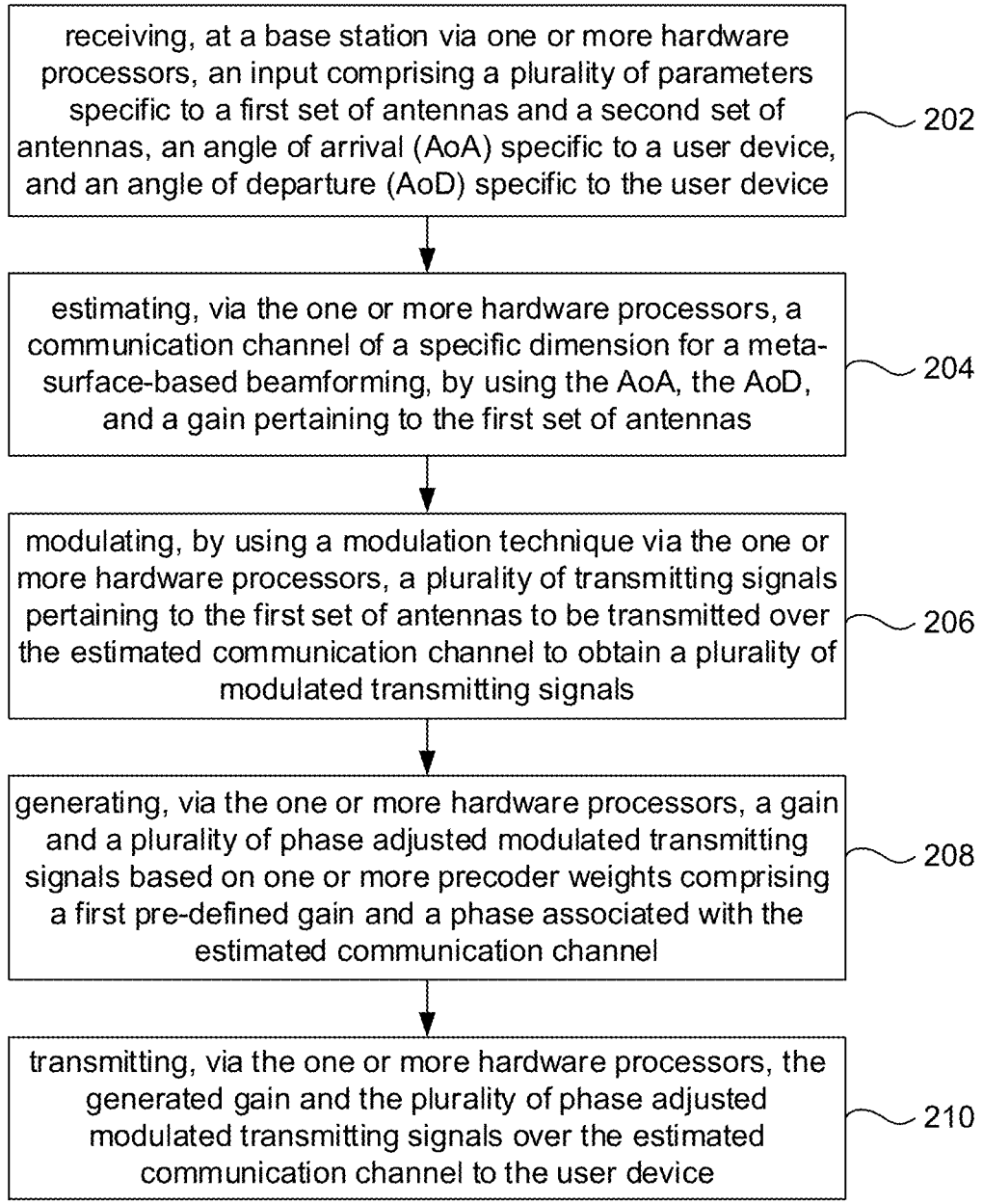
FIG. 5 depicts an exemplary flow chart illustrating a method for meta-surface-based beamforming, using the systems of FIGS. 2 through 4, in accordance with an embodiment of the present disclosure.
Figure 6:
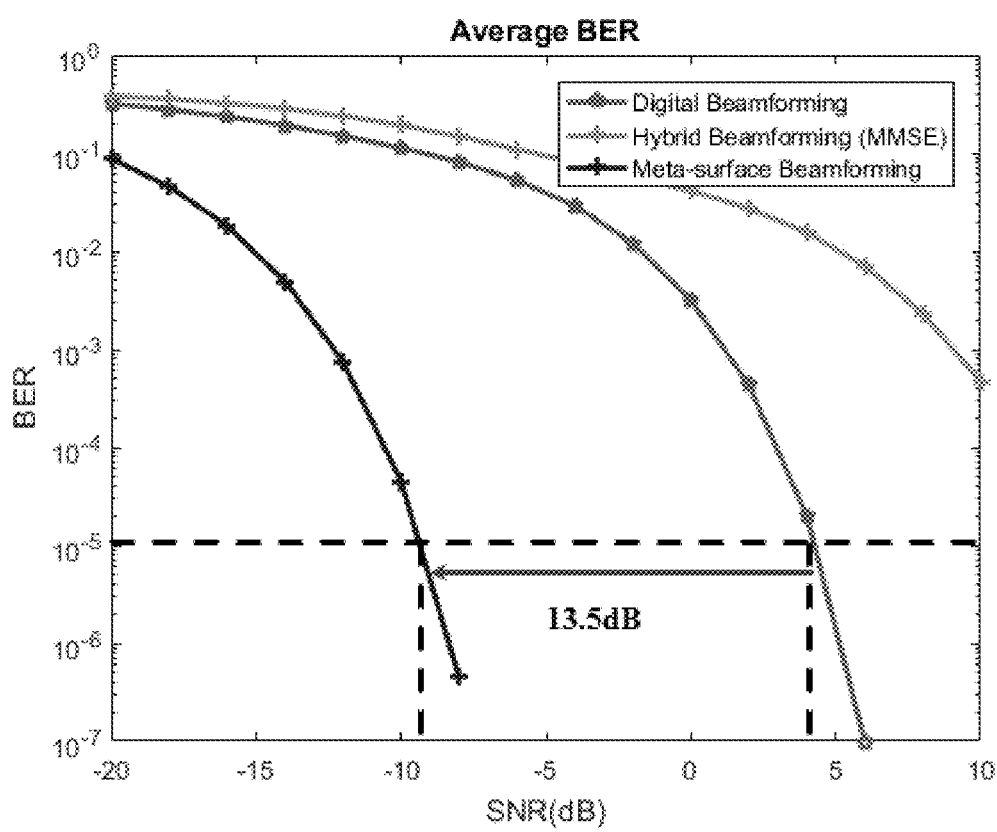
FIG. 6 depicts a graphical representation illustrating an average Bit Error Rate (BER) of Digital Beamforming (DB), Hybrid Beamforming (DB) and meta-surface-based beamforming (method of the present disclosure) approaches, in accordance with an embodiment of the present disclosure.

FIG. 5, with reference to FIGS. 2 through 4, depicts an exemplary flow chart illustrating a method for meta-surface-based beamforming, using the systems of FIGS. 2 through 4, in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 of FIG. 1, the block diagram of the system 100 depicted in FIGS. 2 through 4, and the flow diagram as depicted in FIG. 5.

At step 202 of the method of the present disclosure, the one or more hardware processors 104 of the base station receive an input comprising a plurality of parameters specific to a first set of antennas and a second set of antennas, an angle of arrival (AoA) specific to a user device, and an angle of departure (AoD) specific to the user device. Additionally, the base station receives information pertaining to a plurality of data streams ($N_s$) associated with the first set of antennas and the second set of antennas. The plurality of data streams comprises a plurality of transmitting signals and a plurality of received signals.

At step 204 of the method of the present disclosure, the one or more hardware processors 104 of the base station estimate a communication channel of a specific dimension for a meta-surface-based beamforming, by using the AoA, the AoD, and a gain pertaining to the first set of antennas. The communication channel is estimated by firstly calculating a delay for each of the first set of antennas, based on the AoD of the plurality of transmitting signals corresponding to the first set of antennas. Further, a plurality of steering vectors for the first set of antennas from the delay. Based on the plurality of steering vectors and a directional gain of each of the first set of antennas the communication channel is estimated. The plurality of steering vectors is calculated based on the delay that maximizes strength of the plurality of transmitting signals, in one embodiment of the present disclosure.

At step 206 of the method of the present disclosure, the one or more hardware processors 104 of the base station modulate, by using a modulation technique, the plurality of transmitting signals pertaining to the first set of antennas to be transmitted over the estimated communication channel to obtain a plurality of modulated transmitting signals.

At step 208 of the method of the present disclosure, the one or more hardware processors 104 of the base station generate a gain and a plurality of phase adjusted modulated transmitting signals based on one or more precoder weights comprising a first pre-defined gain and a phase associated with the estimated communication channel.

At step 210 of the method of the present disclosure, the one or more hardware processors 104 of the base station transmit the generated gain and the plurality of phase adjusted modulated transmitting signals over the estimated communication channel to the user device. In the present disclosure, when the generated gain and the plurality of phase adjusted modulated transmitting signals are transmitted over the estimated communication channel to the user device the system 100 or the base station ensures that a varying Gaussian noise component is present (or included) in the estimated communication channel.

The generated gain and the plurality of phase adjusted modulated transmitting signals are transmitted over the estimated communication channel to the user device (e.g., receiver side). The generated gain and the plurality of phase adjusted modulated transmitting signals are then decoded to obtain a set of modulated received signals. The step of decoding the generated gain and the plurality of phase adjusted modulated transmitting signals to obtain the set of modulated received signals is based on a transpose of one or more combiner weights comprising a second pre-defined gain and a phase associated with to the estimated communication channel. The plurality of modulated received signals are demodulated by using the demodulation technique to obtain a plurality of received signals. Further, the plurality of transmitting signals and the plurality of received signals are compared and performance of the meta-surface-based beamforming is estimated based on the comparison.

The steps 202 through 210 and steps at the receiver end for estimating the performance of the meta-surface-based beamforming are better understood by way of following description.

Considering, the HB architecture setup shown in FIG. 3, the system 100 aims to transmit the plurality of data streams ($N_s$) (also referred as data symbols) from the base station comprising of $N_T$ antennas having $N_T^{RF}$ RF chains ($N_T^{RF} \leq N_T$) as shown in FIG. 3. Beamforming on a transmitter side (e.g., base station) is referred as a precoder and at receiver side (e.g., say user device/user equipment such as a mobile communication device, and the like) is referred as a combiner. F denotes precoding matrix at the transmitter side which can be decomposed and expressed as $F = F_{RF}F_{BB}$, where $F_{BB} \in \mathbb{C}^{N_T^{RF} \times N}$, denotes the digital precoder and $F_{RF} \in \mathbb{C}^{N_T \times N_T^{RF}}$, denotes the analog precoder. Now the pre-coded symbols can be expressed as given in equation (1) below:

$$x = F_{RF}F_{BB} \quad (1)$$

where, $s \in \mathbb{C}^{N_s \times 1}$ is transmit data symbols (refer step 206).

The signal received as receiver side is given in below equation (2):

$$y = Hx + n \quad (2)$$

$$y = HF_{RF}F_{BB}s + n \quad (3)$$

Above equation (3) is obtained by substituting (1) in (2). y—received signal and $y \in \mathbb{C}^{K \times 1}$, H—downlink channel matrix and $H \in \mathbb{C}^{N_R \times N_T}$, n is noise component that satisfies the Gaussian distribution with mean=0 and variance=$\sigma^2$.

At the receiver side, the system 100 assumes DB whose combiner matrix is denoted as W.

$$\tilde{s} = W^H y. \quad (4)$$

where $\tilde{s}$ is the symbol decoded at the receiver.

Due to limited scattering nature of mmWave, the system 100 assumes a standard parametric model as known in the art, and the same is expressed as:

$$H = \sqrt{\frac{N_T N_R}{N_{ray}}} \sum_{l=1}^{N_{ray}} \alpha_l a_R(\Theta_l^r) a_T^H(\Theta_l^t) \quad (5)$$

where, $\alpha_l$ is the complex channel gain of the $l^{th}$ path between the precoder and the combiner. The angles $\Sigma_l^r$ and $\Theta_l^t$ represent the angle of arrival (AoA) and angle of departure (AoD). The total number of spatial paths are represented as $N_{ray}$. For the sake of simplicity, the system 100 considered a specific antenna arrangement such as uniform linear array (ULA) whose steering vectors $a_T^H(\Theta_l^t)$ and $a_R(\Theta_l^r)$ can be expressed as below:

$$a_T(\Theta_l^t) = \sqrt{\frac{1}{N_T}} \left[ 1, e^{j\frac{2\pi}{\lambda}d\sin(\Theta_l^t)}, \ldots, e^{j\frac{2\pi}{\lambda}(N_T-1)d\sin(\Theta_l^t)} \right] \quad (6)$$

$$a_R(\Theta_l^r) = \sqrt{\frac{1}{N_r}} \left[ 1, e^{j\frac{2\pi}{\lambda}d\sin(\Theta_l^r)}, \ldots, e^{j\frac{2\pi}{\lambda}(N_R-1)d\sin(\Theta_l^r)} \right] \quad (7)$$

where, $\lambda$ represents the wavelength and d is the inter antenna element spacing at the transmitter and receiver side ($d \leq \lambda/2$).

It is to be understood by a person having ordinary skill in the art or person skilled in the art that the above arrangement of ULA shall not be construed as limiting the scope of the present disclosure.

It is to be assumed in DB that the perfect channel state information (CSI) is known and taking singular value decomposition (SVD), the communication channel H is decomposed as $H = W \Lambda F^H$ as expressed in equation (8), where W is a left singular matrix, whose dimension is $N_R \times N_T$, $\Lambda$ is a diagonal matrix of non-negative singular values that are arranged in a descending order with the dimension $N_T \times N_T$ and F is the right matrix of dimension $N_T \times N_T$.

$$H = \begin{bmatrix} W_{11} & W_{21} & \ldots & W_{1N_T} \\ W_{21} & W_{22} & \ldots & W_{2N_T} \\ . & . & \ldots & . \\ . & . & \ldots & . \\ W_{N_R 1} & W_{N_R 2} & \ldots & W_{N_R N_T} \end{bmatrix} \begin{bmatrix} \Lambda_1 & 0 & \ldots & 0 \\ 0 & \Lambda_2 & \ldots & 0 \\ . & . & \ldots & . \\ . & . & \ldots & . \\ 0 & 0 & \ldots & \Lambda_{N_T} \end{bmatrix} \quad (8)$$

$$\begin{bmatrix} F_{11}^* & F_{21}^* & \ldots & F_{N_T 1}^* \\ F_{12}^* & F_{22}^* & \ldots & F_{N_T 2}^* \\ . & . & \ldots & . \\ . & . & \ldots & . \\ F_{1N_T}^* & F_{2N_T}^* & \ldots & F_{N_T N_T}^* \end{bmatrix}$$

Substituting $H = W \Lambda F^H$ in (2), the following equation (9) is obtained:

$$y = W \Lambda F^H x + n \quad (9)$$

(refer Gaussian component in the communication channel).

The transmitted signal after precoding is denoted as x=Fs and on substituting x in equation (9), the following equation (10) is obtained.

$$y = W \Lambda F^H F s + n \quad (10)$$

At the receiver sider (e.g., the user device), the received signal is multiplied by the combiner weight $W^H$, and this is represented as given in equation (11).

$$W^H y = W^H W \Lambda F^H F s + W^H n \qquad (11)$$

From (11), $W^H y$ and the noise vector $W^H n$ is denoted as $\tilde{s}$, $\tilde{n}$ and considering $W^H W$ or $WW^H = I$ and $F^H F$ or $FF^H = I$, equation (11) is written as:

$$\tilde{s} = \Lambda s + \tilde{n} \qquad (12)$$

$$\begin{bmatrix} \tilde{s}_1 \\ \tilde{s}_2 \\ . \\ . \\ \tilde{s}_{N_s} \end{bmatrix} = \begin{bmatrix} \Lambda_1 & 0 & 0 & 0 \\ . & \Lambda_2 & 0 & 0 \\ . & . & . & . \\ . & . & . & . \\ . & . & . & \Lambda_{N_s} \end{bmatrix} \begin{bmatrix} s_1 \\ s_2 \\ . \\ . \\ s_{N_s} \end{bmatrix} + \begin{bmatrix} \tilde{n}_1 \\ \tilde{n}_2 \\ . \\ . \\ \tilde{n}_{N_s} \end{bmatrix} \qquad (13)$$

where, $\tilde{s}_j$; j varies from 1 to $N_s$ represents the symbol received on each user, $\tilde{\Lambda}_j$; j varies from 1 to $N_s$, represents the gain of each channel corresponding to each user, $\tilde{s}_j$; j varies from 1 to $N_s$, represents the symbol transmitted for each user and $n_j$; j varies from 1 to $N_s$ is the Gaussian noise for each channel.

In HB, the optimal precoder weight as mentioned above is $F = F_{RF} F_{BB}$. In literature, multiple approach like simultaneous orthogonal matching pursuit (SOMP) algorithm have been utilized to estimate $F_{BB}$ by fixing $F_{RF}$. The combiner weight W obtained from SVD is used at the receiver side to decode the transmitted symbol as given in equation (11).

As described above, HB architecture requires a considerable hardware elements like PS and associated components. The following description illustrates, meta-surface-based MIMO architecture that avoids the use of PS.

It is to be noted that each meta-surface comprises of an isotropic antenna mounted appropriately which makes the beam directive. FIG. 4 depicts the meta-surface-based beamforming architecture, wherein each meta-surface is tilted such that they have directional beam in different direction. It can further be noticed that the arrangement is such that the beams partially overlap as indicated in FIG. 4.

Further, each meta-surface is connected via its corresponding/associated RF chain. Hence, as similar to DB based architecture, the number of RF chain is same as the meta-surfaces present therein. Hence, the plurality of modulated transmitting signals is expressed as follows:

$$x = F^{MS} s, \qquad (14)$$

where, $F^{MS}$ is precoder matrix for the meta-surface-based beamforming architecture depicted in FIG. 4.

Similar to earlier scenario, the system 100 described herein assumes standard parametric model for estimation of the communication channel $H_{MS}$ (refer step 204 and sub steps of 204) and this can be expressed as:

$$H_{MS} = \sqrt{\frac{N_T N_R}{N_{ray}}} \sum_{l=1}^{N_{ray}} \alpha_l a_R(\Theta_l^r) (g^{MS}(\Theta_l^t) \odot a_T(\Theta_l^t))^H \qquad (15)$$

Where, $g^{MS}(\Theta_l^t)$ is the gain of each transmit antenna elements that is dependent on the gain pattern, and $\odot$ denotes the dot wise product.

Since the architecture of FIG. 4 of the present disclosure is similar to DB architecture, $F^{MS}$ and $W^{MS}$ are the precoder and combiner weights obtained from SVD of $H_{MS}$. In other words, the one or more precoder weights and the one or more combiner weights are calculated from the estimated communication channel using a singular value decomposition technique.

$$\begin{bmatrix} \tilde{s}_1 \\ \tilde{s}_2 \\ . \\ . \\ \tilde{s}_{N_s} \end{bmatrix} = \begin{bmatrix} \Lambda_1^{MS} & 0 & 0 & 0 \\ . & \Lambda_2^{MS} & 0 & 0 \\ . & . & . & . \\ . & . & . & . \\ . & . & . & \Lambda_{N_s}^{MS} \end{bmatrix} \begin{bmatrix} s_1 \\ s_2 \\ . \\ . \\ s_{N_s} \end{bmatrix} + \begin{bmatrix} \tilde{n}_1 \\ \tilde{n}_2 \\ . \\ . \\ \tilde{n}_{N_s} \end{bmatrix} \qquad (16)$$

While for sake of brevity, the system and method of the present disclosure have considered a single user. This approach can be scaled for multiple users via spatial multiplexing by using the principle of orthogonality and using different CSI metrics corresponding to each user.

Simulation Results:

The precoder and combiner weights of the method of the present disclosure (e.g., meta-surface-based beamforming) have being designed using SVD as described above. Conventional multi-user MIMO DB also used SVD to determine their weights. The number of transmit antenna, receive antenna and the number of RF chains used in the design of different beamforming designs are tabulated in Table 1 below for the purpose of illustration. The number of spatial paths $N_{ray}$ considered in the system and method of the present disclosure was set to 10.

TABLE 1

| S. No | Beamforming type | Number of symbols/data streams/ signals ($N_s$) | Number of transmit antennas (first set of antennas) ($N_T$) | Number of receive antennas (second set of antennas) ($N_R$) | Number of transmit RF chains ($N_T^{RF}$) | Number of receive RF chains ($N_R^{RF}$) |
|---|---|---|---|---|---|---|
| 1 | Digital Beamforming (DB) | 2 | 16 | 4 | 16 | 4 |
| 2 | Hybrid Beamforming (DB) | 2 | 16 | 4 | 4 | 4 |

TABLE 1-continued

| S. No | Beamforming type | Number of symbols/data streams/ signals ($N_s$) | Number of transmit antennas (first set of antennas) ($N_T$) | Number of receive antennas (second set of antennas) ($N_R$) | Number of transmit RF chains ($N_T^{RF}$) | Number of receive RF chains ($N_R^{RF}$) |
|---|---|---|---|---|---|---|
| 3 | Meta-surface-based beamforming (method of the present disclosure) | 2 | 4 | 4 | 4 | 4 |

In the present disclosure, the step of performing the comparison of the transmitting signals and the receiving signals for estimating the performance of the meta-surface-based beamforming is based on a Signal to Noise Ratio (SNR) and a Bit Error Rate (BER) of the plurality of transmitting signals and the plurality of received signals.

Figure 7:
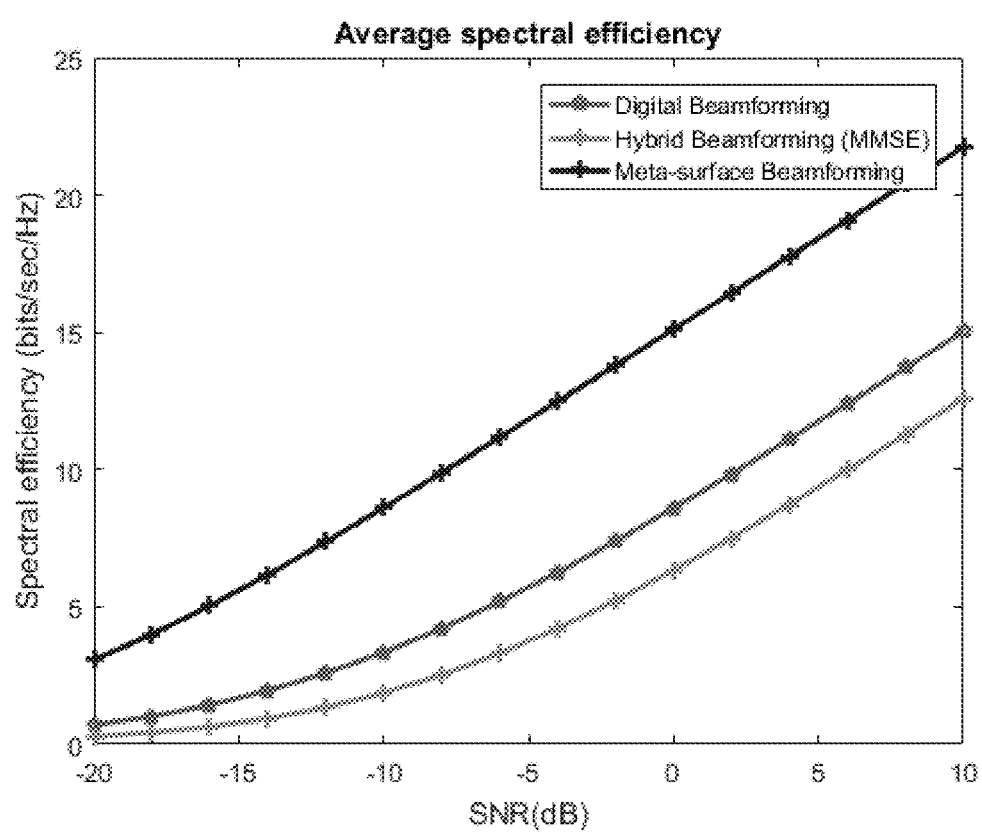
FIG. 7 depicts a graphical representation illustrating an average spectral efficiency (SE) of Digital Beamforming (DB), Hybrid Beamforming (DB) and meta-surface-based beamforming (method of the present disclosure) approaches, in accordance with an embodiment of the present disclosure.

The performance of the three approaches is compared using the standard BER and spectral efficiency (SE). The SE is given by $\log_2|I+(\sigma_n^2 W^H W)^{-1} W^H H F F^H H^H W|$ bits/sec/Hz. The average BER and SE performance for the SNR varied form −20 dB to +10 dB, in one example embodiment of the present disclosure. Further it can be inferred from FIG. 6 and FIG. 7, that the meta-surface-based beamforming (method of the present disclosure) performs better than the DB and HB approach. More specifically, FIG. 6, with reference to FIGS. 2 through 5, depicts a graphical representation illustrating an average Bit Error Rate (BER) of Digital Beamforming (DB), Hybrid Beamforming (DB) and meta-surface-based beamforming (method of the present disclosure) approaches, in accordance with an embodiment of the present disclosure. FIG. 7, with reference to FIGS. 1 through 6, depicts a graphical representation illustrating an average spectral efficiency (SE) of Digital Beamforming (DB), Hybrid Beamforming (DB) and meta-surface-based beamforming (method of the present disclosure) approaches, in accordance with an embodiment of the present disclosure. From FIG. 6, using DB, the BER of $10^{-5}$ has been achieved when the SNR is at 4 dB approximately. However, using the meta-surface-based beamforming (method of the present disclosure) the same BER can be achieved at −9.5 dB. It is apparent that using the meta-surface-based beamforming (method of the present disclosure), the directional gain of 13.5 dB significantly improved its performance. It is also important to note that design of the meta-surface-based beamforming (method of the present disclosure) uses only 4 meta-surfaces whereas the counterparts (DB and HB) use 16 antenna elements. Based on the experiments conducted, the angle of arrival (AoA) and the angle of departure (AoD) for the system and method of the present disclosure are obtained based on a scanning angle ranging between a first pre-defined angle. More specifically, the first pre-defined angle and the second pre-defined angle have been +45 and −45 respectively (−45' to +45'), whereas the DB scan ranged from −90° to +90°. However, the examples of the scanning angle (−45' to +45') shall not be construed as limiting the scope of the present disclosure. By incorporating multiple meta-surfaces by the system, and mechanical tilting and fixing these meta-surfaces towards the specific direction, directional beams with partial overlapping of each beam is obtained. The precoder and combiner weights for the DB and HB are obtained by decomposing H of 16th order. However, the meta-surface-based beamforming (method of the present disclosure) requires $4^{th}$ order $H_{MS}$. Thus, the meta-surface-based beamforming technique (method of the present disclosure) results in significant reduction in computational complexity.

The system of the present disclosure showed the performance of meta-surface-based beamforming technique (method of the present disclosure) for a single user, it can be scaled for multiple users based on multi-user MIMO beamforming approach. Different beamforming approaches (DB, HB, and meta-surface-based beamforming technique (method of the present disclosure)) have been considered at precoder side and DB at the combiner side. From the simulation results it is clear that the meta-surface-based beamforming technique (method of the present disclosure) and the system 100 (refer FIG. 4) not only reduces the computational complexity and hardware components like RF chains and PS but also performed better than DB and HB. The directional gain of meta-surface is a crucial factor that significantly improved the performance of the meta-surface-based beamforming (method of the present disclosure). Thus, the meta-surface-based beamforming (method of the present disclosure) with reduced computational complexity and hardware components can be considered beamforming.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
    receiving, at a base station via one or more hardware processors, an input comprising a plurality of parameters specific to a first set of antennas and a second set of antennas, an angle of arrival (AoA) specific to a user device, and an angle of departure (AoD) specific to the user device, wherein the angle of arrival (AA) and the angle of departure (AoD) are obtained based on a scanning angle ranging between a first pre-defined angle and a second pre-defined angle;
    estimating, via the one or more hardware processors, a communication channel of a specific dimension for a meta-surface-based beamforming, by using the AoA, the AoD, and a gain pertaining to the first set of antennas;
    modulating, by using a modulation technique via the one or more hardware processors, a plurality of transmitting signals pertaining to the first set of antennas to be transmitted over the estimated communication channel to obtain a plurality of modulated transmitting signals;
    generating, via the one or more hardware processors, a gain and a plurality of phase adjusted modulated transmitting signals based on one or more precoder weights comprising a first pre-defined gain and a phase associated with the estimated communication channel; and
    transmitting, via the one or more hardware processors, the generated gain and the plurality of phase adjusted modulated transmitting signals over the estimated communication channel to the user device.

2. The processor implemented method of claim 1, wherein the step of estimating the communication channel comprises:
    calculating a delay for each of the first set of antennas, based on the AoD of the plurality of transmitting signals corresponding to the first set of antennas;
    calculating a plurality of steering vectors for the first set of antennas from the delay; and
    estimating the communication channel based on the plurality of steering vectors and a directional gain of each of the first set of antennas.

3. The processor implemented method of claim 2, wherein the plurality of steering vectors is calculated based on the delay that maximizes strength of the plurality of transmitting signals.

4. The processor implemented method of claim 1, wherein the step of transmitting the generated gain and the plurality of phase adjusted modulated transmitting signals over the estimated communication channel to the user device comprises a varying Gaussian noise component in the estimated communication channel.

5. The processor implemented method of claim 1, wherein at the user device, one or more hardware processors comprised therein are configured to:
    receive, via the second set of antennas over the estimated communication channel, the generated gain and the plurality of phase adjusted modulated transmitting signals;
    decode the generated gain and the plurality of phase adjusted modulated transmitting signals to obtain a set of modulated received signals;
    demodulate, by using the demodulation technique, the plurality of modulated received signals to obtain a plurality of received signals;
    perform a comparison of the plurality of transmitting signals and the plurality of received signals; and
    evaluate a performance of the meta-surface-based beamforming based on the comparison.

6. The processor implemented method of claim 5, wherein the step of decoding the generated gain and the plurality of phase adjusted modulated transmitting signals to obtain the set of modulated received signals is based on a transpose of one or more combiner weights comprising a second pre-defined gain and a phase associated with to the estimated communication channel, and wherein the one or more precoder weights and the one or more combiner weights are calculated from the estimated communication channel using a singular value decomposition technique.

7. The processor implemented method of claim 5, wherein the step of performing the comparison is based on a Signal to Noise Ratio (SNR) and a Bit Error Rate (BER) of the plurality of transmitting signals and the plurality of received signals.

8. A base station, comprising:
a memory storing instructions;
one or more communication interfaces; and
one or more hardware processors coupled to the memory via the one or more communication interfaces, wherein the one or more hardware processors are configured by the instructions to:
receive an input comprising a plurality of parameters specific to a first set of antennas and a second set of antennas, an angle of arrival (AoA) specific to a user device, and an angle of departure (AoD) specific to the user device, wherein the angle of arrival (AoA) and the angle of departure (AoD) are obtained based on a scanning angle ranging between a first pre-defined angle and a second pre-defined angle;
estimate a communication channel of a specific dimension for a meta-surface-based beamforming, by using the AoA, the AoD, and a gain pertaining to the first set of antennas;
modulate, by using a modulation technique, a plurality of transmitting signals pertaining to the first set of antennas to be transmitted over the estimated communication channel to obtain a plurality of modulated transmitting signals;
generate a gain and a plurality of phase adjusted modulated transmitting signals based on one or more precoder weights comprising a first pre-defined gain and a phase associated with the estimated communication channel; and
transmit the generated gain and the plurality of phase adjusted modulated transmitting signals over the estimated communication channel to the user device.

9. The base station of claim 8, wherein the communication channel is estimated by:
calculating a delay for each of the first set of antennas, based on the AoD of the plurality of transmitting signals corresponding to the first set of antennas;
calculating a plurality of steering vectors for the first set of antennas from the delay; and
estimating the communication channel based on the plurality of steering vectors and a directional gain of each of the first set of antennas.

10. The base station of claim 9, wherein the plurality of steering vectors is calculated based on the delay that maximizes strength of the plurality of transmitting signals.

11. The base station of claim 8, wherein the generated gain and the plurality of phase adjusted modulated transmitting signals over the estimated communication channel to the user device comprise a varying Gaussian noise component in the estimated communication channel.

12. The base station of claim 8, wherein at the user device, one or more hardware processors comprised therein are configured to:
receive, via the second set of antennas over the estimated communication channel, the generated gain and the plurality of phase adjusted modulated transmitting signals;
decode the generated gain and the plurality of phase adjusted modulated transmitting signals to obtain a set of modulated received signals;
demodulate, by using the demodulation technique, the plurality of modulated received signals to obtain a plurality of received signals;
perform a comparison of the plurality of transmitting signals and the plurality of received signals; and
evaluate a performance of the meta-surface-based beamforming based on the comparison.

13. The base station of claim 12, wherein the generated gain and the plurality of phase adjusted modulated transmitting signals decoded to obtain the set of modulated received signals is based on a transpose of one or more combiner weights comprising a second pre-defined gain and a phase associated with to the estimated communication channel, and wherein the one or more precoder weights and the one or more combiner weights are calculated from the estimated communication channel using a singular value decomposition technique.

14. The base station of claim 12, wherein the comparison is based on a Signal to Noise Ratio (SNR) and a Bit Error Rate (BER) of the plurality of transmitting signals and the plurality of received signals.

15. One or more non-transitory machine-readable information storage mediums comprising one or more instructions which when executed by one or more hardware processors cause:
receiving, at a base station, an input comprising a plurality of parameters specific to a first set of antennas and a second set of antennas, an angle of arrival (AoA) specific to a user device, and an angle of departure (AoD) specific to the user device, wherein the angle of arrival (AoA) and the angle of departure (AoD) are obtained based on a scanning angle ranging between a first pre-defined angle and a second pre-defined angle;
estimating a communication channel of a specific dimension for a meta-surface-based beamforming, by using the AoA, the AoD, and a gain pertaining to the first set of antennas;
modulating, by using a modulation technique, a plurality of transmitting signals pertaining to the first set of antennas to be transmitted over the estimated communication channel to obtain a plurality of modulated transmitting signals;
generating a gain and a plurality of phase adjusted modulated transmitting signals based on one or more precoder weights comprising a first pre-defined gain and a phase associated with the estimated communication channel; and
transmitting the generated gain and the plurality of phase adjusted modulated transmitting signals over the estimated communication channel to the user device.

16. The one or more non-transitory machine-readable information storage mediums of claim 15, wherein the step of estimating the communication channel comprises:
calculating a delay for each of the first set of antennas, based on the AoD of the plurality of transmitting signals corresponding to the first set of antennas;
calculating a plurality of steering vectors for the first set of antennas from the delay; and
estimating the communication channel based on the plurality of steering vectors and a directional gain of each of the first set of antennas.

17. The one or more non-transitory machine-readable information storage mediums of claim 16, wherein the plurality of steering vectors is calculated based on the delay that maximizes strength of the plurality of transmitting signals.

18. The one or more non-transitory machine-readable information storage mediums of claim 15, wherein the step of transmitting the generated gain and the plurality of phase adjusted modulated transmitting signals over the estimated communication channel to the user device comprises a varying Gaussian noise component in the estimated communication channel,
- wherein at the user device, one or more hardware processors comprised therein are configured to:
- receive, via the second set of antennas over the estimated communication channel, the generated gain and the plurality of phase adjusted modulated transmitting signals;
- decode the generated gain and the plurality of phase adjusted modulated transmitting signals to obtain a set of modulated received signals;
- demodulate, by using the demodulation technique, the plurality of modulated received signals to obtain a plurality of received signals;
- perform a comparison of the plurality of transmitting signals and the plurality of received signals; and
- evaluate a performance of the meta-surface-based beamforming based on the comparison,
- wherein the step of decoding the generated gain and the plurality of phase adjusted modulated transmitting signals to obtain the set of modulated received signals is based on a transpose of one or more combiner weights comprising a second pre-defined gain and a phase associated with to the estimated communication channel, and wherein the one or more precoder weights and the one or more combiner weights are calculated from the estimated communication channel using a singular value decomposition technique, and
- wherein the step of performing the comparison is based on a Signal to Noise Ratio (SNR) and a Bit Error Rate (BER) of the plurality of transmitting signals and the plurality of received signals.

* * * * *